(12) United States Patent
Persson et al.

(10) Patent No.: US 9,763,171 B2
(45) Date of Patent: *Sep. 12, 2017

(54) EXTENDING EARFCN VALUE RANGE IN GERAN

(71) Applicant: TELEFONAKTIEBOLAGET LM ERICSSON (PUBL), Stockholm (SE)

(72) Inventors: Claes-Göran Persson, Mjölby (SE); Nicklas Johansson, Brokind (SE); Paul Schliwa-Bertling, Ljungsbro (SE); John Walter Diachina, Garner, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/187,127

(22) Filed: Jun. 20, 2016

(65) Prior Publication Data

US 2016/0295498 A1 Oct. 6, 2016

Related U.S. Application Data

(63) Continuation of application No. 14/466,556, filed on Aug. 22, 2014, now Pat. No. 9,374,701.

(Continued)

(51) Int. Cl.
*H04W 48/10* (2009.01)
*H04W 8/08* (2009.01)
(Continued)

(52) U.S. Cl.
CPC .............. *H04W 48/10* (2013.01); *H04W 8/08* (2013.01); *H04W 36/0061* (2013.01); *H04W 36/14* (2013.01); *H04W 88/06* (2013.01)

(58) Field of Classification Search
CPC ........ H04W 8/08; H04W 48/10; H04W 48/12; H04W 48/08
(Continued)

(56) References Cited

U.S. PATENT DOCUMENTS

| 2010/0278066 A1* | 11/2010 | Hole ................ H04W 36/0061 370/252 |
| 2014/0148156 A1* | 5/2014 | Kubota ................ H04W 48/12 455/434 |
| 2014/0287749 A1* | 9/2014 | Kuningas .......... H04W 36/0055 455/434 |

OTHER PUBLICATIONS

3GPP TS 44.018 V11.5.0 (May 2013), 3rd Generation Partnership Project; Technical Specification Group GSM/EDGE Radio Access Network; Mobile radio interface layer 3 specification; Radio Resource Control (RRC) protocol (Release 11), Generation Partnership Project (3GPP) Mobile Competence Centre; 650 Route Des Lucioles; F-06921 Sophia-Antipolis Cedex, France, vol. GERAN WG2, No. V11.5.0, Jun. 24, 2013 (Jun. 24, 2013), pp. 1-467.

(Continued)

*Primary Examiner* — Qutbuddin Ghulamali

(57) ABSTRACT

An E-UTRAN neighbor cell list is broadcast in a GERAN network using the extended EARFCN value ranges (i.e., 18 bits). Extending the EARFCN value ranges in GERAN and signaling EARFCN values within the extended EARFCN value range to inter-RAT-capable UEs that camp in GERAN allow GERAN to support continued inter-RAT mobility between GERAN and E-UTRAN networks. E-UTRAN neighbor cell information may be communicated to UEs in the GERAN network by System Information message broadcasts using the extended EARFCN value ranges.

18 Claims, 13 Drawing Sheets

Related U.S. Application Data

(60) Provisional application No. 61/869,414, filed on Aug. 23, 2013.

(51) Int. Cl.
*H04W 36/00* (2009.01)
*H04W 36/14* (2009.01)
*H04W 88/06* (2009.01)

(58) Field of Classification Search
USPC .......................................................... 455/434
See application file for complete search history.

(56) References Cited

OTHER PUBLICATIONS

3GPP TSG GERAN#59, "Discussion on EARFCN extension", Telefon AB LM Ericsson, ST-Ericsson, Tdoc GP-130716, Agenda Item 7.2.5.3.6, Sofia, Bulgaria, Aug. 26-30, 2013, the whole document.

3GPP TSG GERAN WG2, 3GPP TSG-RAN WG2 Meeting #81, "Reply LS on extending E-UTRA band number and EARFCN numbering space", R2-130875, TSGG#57(13)0086, Agenda Item: 7.2.4.1, Vienna, Austria, Feb. 26-28, 2013, the whole document.

3GPP TSG GERAN#59, "Discussion on MFBI support in GERAN", Telefon AB LM Ericsson, ST-Ericsson, Tdoc GP-130717, Agenda Item 7.2.5.3.6, Sofia, Bulgaria, Aug. 26-30, 2013, the whole document.

3GPP TSG GERAN#59, "Discussion on EARFCN extension", Telefon AB LM Ericsson, ST-Ericsson, Tdoc GP-130744, Agenda Item 7.2.5.3.6, Sofia, Bulgaria, Aug. 26-30, 2013, the whole document.

3rd Generation Partnership Project; Technical Specification Group Radio Access Network; Evolved Universal Terrestrial Radio Access (E-UTRA); User Equipment (UE) radio transmission and reception (Release 11). 3GPP TS 36.101 v11.5.0 (Jul. 2013), the whole document.

3rd Generation Partnership Project; Technical Specification Group Core Network and Terminals; Mobile radio interface Layer 3 specification; Core network protocols; Stage 3 (Release 11). 3GPP TS 24.008 v11.7.0 (Jun. 2013), the whole document.

3rd Generation Partnership Project; Technical Specification Group Radio Access Network; Evolved Universal Terrestrial Radio Access (E-UTRA); Radio Resource Control (RRC); Protocol specification (Release 11). 3GPP TS 36.331 v11.4.0 (Jun. 2013), the whole document.

\* cited by examiner

```
< SI 23 Rest Octets > ::=

< SI 23_3G_BA_IND : bit (1) >
    < SI 23_CHANGE_MARK : bit (2) >
    < SI 23_INDEX : bit (3) >
    < SI 23_COUNT : bit (3) >
    { 0 | 1    < IRAT Cell Reselection Information : < IRAT Cell Reselection Information struct >> }
    < spare padding > ;

< IRAT Cell Reselection Information struct > ::=
    { < Priority and UTRAN Parameters Description for the Common PLMN :
    < Priority and UTRAN Parameters Description struct >> }                 ──── 30
    { < Priority and E-UTRAN Parameters Description for the Common PLMN :
    < Priority and E-UTRAN Parameters Description struct >> }
    < Nb_Additional_PLMNs : bit (2) >
    { < PLMN index : bit (2) >
            { < Priority and UTRAN Parameters Description :
            < Priority and UTRAN Parameters Description struct >> }
            { < Priority and E-UTRAN Parameters Description :
            < Priority and E-UTRAN Parameters Description struct >> }
    } * ( val (Nb_Additional_PLMNs)+1) ;
                                                                     ──── 32
< Priority and E-UTRAN Parameters Description struct > ::=
{ 0     -- Inter RAT Cell Reselection information for E-UTRAN not provided for the corresponding PLMN
  | 1
    { 0             -- E-UTRAN threshold information not provided for the corresponding PLMN
      | 1
            { 0 | 1   < DEFAULT_E-UTRAN_PRIORITY: bit(3) > }
            { 0 | 1   < DEFAULT_THRESH_E-UTRAN_low: bit(5) > }                ──── 34
            { 0 | 1   < DEFAULT_E-UTRAN_QRXLEVMIN : bit(5) > } }
    { 1 < Repeated E-UTRAN Neighbour Frequency and Priority : < Repeated E-UTRAN Neighbour
Frequency and Priority struct >> } ** 0
    { 1 < Repeated E-UTRAN Not Allowed Cells : < Repeated E-UTRAN Not Allowed Cells struct >>
} ** 0
    { 1 < Repeated E-UTRAN PCID to TA mapping : < Repeated E-UTRAN PCID to TA mapping
struct >> } ** 0
    { 0 | 1    < Enhanced Cell Reselection Parameters Description : < Enhanced Cell Reselection
Parameters IE >> } } ;

──── 36
< Repeated E-UTRAN Neighbour Frequency and Priority struct > ::=        ──── 38
            { 1 < EARFCN : bit (18) > -- this was previously a 16 bit field
                    { 0 | 1 < Measurement Bandwidth : bit (3) >} ** 0
            { 0 | 1 < E-UTRAN_PRIORITY : bit(3) > }
            < THRESH_E-UTRAN_high: bit(5) >
            { 0 | 1    < THRESH_E-UTRAN_low : bit(5) > }
            { 0 | 1    < E-UTRAN_QRXLEVMIN : bit(5) > };
```

*FIG. 4*

```
{ null    | 0 bit** =       < no string >     -- Receiver compatible with earlier release
| 1                                            -- Additions in Rel-8
    { 0 | 1    < 3G_BA_IND : bit > < PMO_IND : bit > }
    { 0 | 1    < Priority and E-UTRAN Parameters Description :
                 < Priority and E-UTRAN Parameters Description struct >> }
    { 0 | 1    < Individual Priorities : < Individual Priorities IE >> }
    { 0 | 1    < 3G CSG Description : < 3G CSG Description IE >> }
    { 0 | 1    < E-UTRAN CSG Description : < E-UTRAN CSG Description IE >> }
    { 0 | 1    < Measurement Control Parameters Description :
                 < Measurement Control Parameters Description IE >> }
    { null    | 0 bit** =       < no string >     -- Receiver compatible with earlier release
    | 1                                            -- Additions in Rel-9
        { 0 | 1    < Enhanced Cell Reselection Parameters Description :
                     < Enhanced Cell Reselection Parameters IE >> }
        { 0 | 1    < CSG Cells Reporting Description :
                     < CSG Cells Reporting Description struct >> }
        { null    | 0 bit** =       < no string >     -- Receiver compatible with earlier release
        | 1                                            -- Additions in Rel-11          40
            { 0 | 1    < Priority and E-UTRAN Parameters Description 2 :
                         < Priority and E-UTRAN Parameters Description 2 struct >> }  42
                { 0 | 1    < Individual Priorities 2 : < Individual Priorities 2 IE >> }
        { null    | 0 bit** =       < no string >     -- Receiver compatible with earlier release
```

44

< Priority and E-UTRAN Parameters Description 2 struct > ::=
    { 0 | 1    < Serving Cell Priority Parameters Description : < GSM Priority Parameters IE >> }
    { 0 | 1    < 3G Priority Parameters Description : < 3G Priority Parameters IE >> }
    { 0 | 1    < E-UTRAN Parameters Description : < E-UTRAN Parameters 2 IE >> } ;    46

< E-UTRAN Parameters 2 IE > ::=    48
    < E-UTRAN_CCN_ACTIVE : bit >
    { 0 | 1    < GPRS E-UTRAN Measurement Parameters :    50
        < GPRS E-UTRAN Measurement Parameters struct >> }
    { 1 < Repeated E-UTRAN Neighbour Cells : < Repeated E-UTRAN Neighbour Cells 2 struct >> } ** 0
    { 1 < Repeated E-UTRAN Not Allowed Cells : < Repeated E-UTRAN Not Allowed Cells struct >> } ** 0
    { 1 < Repeated E-UTRAN PCID to TA mapping : < Repeated E-UTRAN PCID to TA mapping struct >> } ** 0 ;

*FIG. 5A*

< Repeated E-UTRAN Neighbour Cells 2 struct > ::= ← 52
    { 1 < EARFCN : bit (18) > ← 54
        { 0 | 1 < Measurement Bandwidth : bit (3) > } } ** 0
    { 0 | 1  < E-UTRAN_PRIORITY : bit(3) > }
    < THRESH_E-UTRAN_high : bit(5) >
    { 0 | 1   < THRESH_E-UTRAN_low : bit(5) > }
    { 0 | 1   < E-UTRAN_QRXLEVMIN : bit(5) > } ;

< Individual priorities 2 IE > ::=  ← 56
    { 0 |         -- delete all stored individual priorities
    1             -- provide individual priorities
        < GERAN_PRIORITY : bit(3) >
        { 0 | 1    < 3G Individual Priority Parameters Description :
            < 3G Individual Priority Parameters Description struct >> }
        { 0 | 1    < E-UTRAN Individual Priority Parameters Description :
            < E-UTRAN Individual Priority Parameters Description 2 struct >> }
        { 0 | 1    < T3230 timeout value : bit (3) > } };
                                                      ← 58

< E-UTRAN Individual Priority Parameters Description 2 struct > ::= ← 60
    { 0 | 1    < DEFAULT_E-UTRAN_PRIORITY : bit(3) > }
    { 1        < Repeated Individual E-UTRAN Priority Parameters :
            < Repeated Individual E-UTRAN Priority Parameters 2 struct >> } ** 0 ;
                                      ← 62

< Repeated Individual E-UTRAN Priority Parameters 2 struct > ::= ← 64
    { 1 < EARFCN : bit (18) > } ** 0
    < E-UTRAN_PRIORITY : bit(3) >  ← 66

*FIG. 5B*

```
| 110           -- Extension in Rel-8 for E-UTRAN and an escape bit for future extensions of the message
     { 0 | 1   < ARFCN : bit (10) >
               < BSIC : bit (6) > }
     { 0 | 1   < 3G Target Cell : < 3G Target Cell Struct >> }
     { 0 | 1   < E-UTRAN Target Cell : < E-UTRAN Target Cell Struct >> }  ◄――― 70
     { 0 | 1   < E-UTRAN CCN Measurement Report : < E-UTRAN CCN Measurement Report struct >
> }

< E-UTRAN Target Cell struct > ::=  ◄―――72
        < EARFCN : bit (16) > EARFCN : bit (18)  ◄―――74
        { 0 | 1 < Measurement Bandwidth: bit (3) > }
        < Physical Layer Cell Identity : bit (9) >
        < REPORTING_QUANTITY : bit (6) > ;         -- Measurement Report for E-UTRAN target cell
```

*FIG. 6*

```
| 1            -- Additions in Rel-5 :
    { 0 | 1 < G-RNTI extension : bit (4) > }
        { null | 0 bit ** = < no string >      -- Receiver compatible with earlier release
        | 1            -- Additions in Rel-8
            { 0 | 1    < E-UTRAN Target cell : < E-UTRAN Target cell IE >>      ◄──── 80
            { 0 | 1    < Individual Priorities : < Individual Priorities IE >> }  ◄──── 82

< E-UTRAN Target cell IE > ::=   ◄──── 84
    < EARFCN : bit (18) >                    ◄──── 86
    { 0 | 1 < Measurement Bandwidth: bit (3) > }
    < Physical Layer Cell Identity : bit (9) > ;

< Individual priorities IE > ::=   ◄──── 87
    { 0 |              -- delete all stored individual priorities
      1                -- provide individual priorities
        < GERAN_PRIORITY : bit(3) >
        { 0 | 1  < 3G Individual Priority Parameters Description :
                    < 3G Individual Priority Parameters Description struct >> }
        { 0 | 1  < E-UTRAN Individual Priority Parameters Description :
                    < E-UTRAN Individual Priority Parameters Description struct >> }
        { 0 | 1  < T3230 timeout value : bit (3) > } };          ◄──── 88
```

*FIG. 7*

{ 0 | 1 < G-RNTI extension : bit (4) > }
{ null | 0 bit ** = < no string >     -- *Receiver compatible with earlier release*
        | 1                           -- *Additions in Rel-8 :*
            { 0 | 1 < E-UTRAN Target cell: < E-UTRAN Target cell IE > > }  ◄——— 90
            { null | 0 bit ** = < no string >    -- *Receiver compatible with earlier release*

< E-UTRAN Target cell IE > ::=  ◄——— 92
    < EARFCN : bit (18) >  ◄——— 94
    { 0 | 1 < Measurement Bandwidth: bit (3) > }
    < Physical Layer Cell Identity : bit (9) > ;

*FIG. 8*

```
\{ 0 | 1   < E-UTRAN Parameters Description :                    ← 100
            < E-UTRAN Parameters Description struct >> }
 { 0 | 1   < E-UTRAN CSG Description : < E-UTRAN CSG Description struct >> }
 {         null | L  -- Receiver compatible with earlier release
                | H                       -- Additions in Rel-9
                    { 0 | 1   < 3G CSG Description : < 3G CSG Description struct >> }
                    { 0 | 1   < UTRAN CSG Cells Reporting Description :
                              < UTRAN CSG Cells Reporting Description struct >> }
 }

< E-UTRAN Parameters Description struct > ::=         ← 102
        < E-UTRAN_Start : bit >
        < E-UTRAN_Stop : bit >
        { 0 | 1   < E-UTRAN Measurement Parameters Description :
                    < E-UTRAN Measurement Parameters Description struct >> }
        { 1 < Repeated E-UTRAN Neighbour Cells : < Repeated E-UTRAN Neighbour Cells struct >> } **
0                                                                            ← 104
        { 1 < Repeated E-UTRAN Not Allowed Cells : < Repeated E-UTRAN Not Allowed Cells struct >>
} ** 0
        { 0 | 1   < E-UTRAN Measurement Control Parameters Description :
                    < E-UTRAN Measurement Control Parameters Description struct >> } ;

< Repeated E-UTRAN Neighbour Cells struct > ::=       ← 106
        < EARFCN : bit (18) >
        { 1 < EARFCN : bit (16) > } ** 0                ← 108
        { 0 | 1 < Measurement Bandwidth : bit (3) > } ;
```

*FIG. 9*

Cell selection indicator after release of all TCH and SDCCH IE

<Cell Selection Indicator after release of all TCH and SDCCH value part> ::= ◄──── 110

```
{       000     { 1     <GSM Description : <GSM Description struct >} ** 0
      | 001     { 1     <UTRAN FDD Description : < UTRAN FDD Description struct >> } ** 0
      | 010     { 1     < UTRAN TDD Description : < UTRAN TDD Description struct >> } ** 0
      | 011     { 1     <E-UTRAN Description : < E-UTRAN Description struct >> } ** 0 };
```
                                                                                        ◄──── 112
< E-UTRAN Description struct > ::= ◄──── 114
    < EARFCN : bit (16) > EARFCN : bit (18) ◄──── 116
    { 0 | 1 < Measurement Bandwidth : bit (3) > }
    { 0 | 1 < Not Allowed Cells: < PCID Group IE > > }
    { 0 | 1 < TARGET_PCID : bit (9) > };

*FIG. 10*

EXTENDING EARFCN VALUE RANGE IN GERAN

CLAIM OF PRIORITY

This application is a Continuation of U.S. patent application Ser. No. 14/466,556, filed on Aug. 22, 2014, which claims the benefit of priority to U.S. Provisional Application No. 61/869,414 filed on Aug. 23, 2013, the entire contents of each of which are hereby incorporated by reference for all purposes.

FIELD OF INVENTION

The present application relates generally to interoperability of wireless communication networks, and in particular to expanded E-UTRA Absolute Radio Frequency Channel Number (EARFCN) value ranges in GSM EDGE Radio Access Network (GERAN) networks.

BACKGROUND

The Evolved UMTS (Universal Mobile Telecommunications System) Radio Access Network (E-UTRAN) is the air interface of the 3GPP Long Term Evolution (LTE) expansion of the wireless communication protocol. E-UTRAN is expected to continuously increase the number of frequency bands utilized for wireless communications. Furthermore, there is expected to be some degree of overlap with other (i.e., new or legacy) E-UTRA frequency bands.

EARFCNs are channel numbers that reflect the center frequency of an E-UTRAN carrier, which may occupy, e.g., 1.4, 3, 5, 10, 15, or 20 MHz, independent of the channel spectrum of the E-UTRAN carrier, which are discussed, for example, in 3GPP TS 36.101 Ver. 11.9.0.

To uniquely identify all anticipated E-UTRAN carriers, 3GPP has agreed to extend the range of EARFCN values from 65535 (i.e., $2^{16}$ from 16 bits) to 262143 (i.e., $2^{18}$ from 18 bits). This allows for a quadrupling of the EARFCN value range, increasing by nearly 4× the number of E-UTRAN carriers that can be identified, although some EARFCN values may be reserved. E-UTRAN-capable User Equipment (UE) that supports an extended EARFCN value range will operate in an E-UTRAN network.

As UE technology advances, many UEs are capable of operating in networks employing any of several different Radio Access Technologies (RATs). These UEs are referred to herein as multi-RAT-capable UEs. For example, a multi-RAT-capable UE may operate in either a GERAN or E-UTRAN network.

One challenge is how to signal EARFCN values within the extended EARFCN value ranges in GERAN to inter-RAT-capable UEs to support continued inter-RAT mobility between GERAN and E-UTRAN networks.

The Background section of this document is provided to place embodiments of the present invention in technological and operational context, to assist those of skill in the art in understanding their scope and utility. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the invention or to delineate the scope of the invention. The sole purpose of this summary is to present some concepts disclosed herein in a simplified form as a prelude to the more detailed description that is presented later.

According to one or more embodiments described and claimed herein, an E-UTRAN neighbor cell list is broadcast in a GERAN network using the extended EARFCN value ranges. Extending the EARFCN value ranges in GERAN and signaling EARFCN values within the extended EARFCN value range to inter-RAT-capable UEs while camping in GERAN allow GERAN to support continued inter-RAT mobility between GERAN and E-UTRAN networks. E-UTRAN neighbor cell information may be communicated to UEs in the GERAN network by System Information (SI) message broadcasts using the extended EARFCN value ranges.

One embodiment relates to a method, performed by a multi-RAT-capable UE that supports an extended EARFCN value range in GERAN. The UE is capable of operating in a GERAN network. The method includes determining that a SI23 message is broadcast by the GERAN network. In response to determining that the SI23 message is broadcast, it is determined that the GERAN network broadcasts E-UTRAN neighbor cell information using the extended EARFCN value range. The method further includes processing the E-UTRAN neighbor cell information using the extended EARFCN value range.

Another embodiment relates to a multi-RAT-capable UE capable of operating in a GERAN network and that supports an extended EARFCN value range. The UE includes a transceiver capable of wirelessly exchanging information with a base station subsystem of the GERAN network; memory; and a controller operatively connected to the transceiver and the memory. The controller is capable of: determining that a SI23 message is broadcast by the GERAN network; in response to determining that the SI23 message is broadcast, determining that the GERAN network broadcasts E-UTRAN neighbor cell information using the extended EARFCN value range; and processing the E-UTRAN neighbor cell information using the extended EARFCN value range.

Yet another embodiment relates to a method, performed by a base station subsystem (BSS) in a GERAN network that employs an extended EARFCN value range, of informing multi-RAT-capable UE of neighboring E-UTRAN cells. The method includes generating a SI23 message including E-UTRAN neighbor cell lists, using the extended EARFCN value range, and broadcasting the SI23 message in the GERAN network.

Still another embodiment relates to a network device, capable of operating in a GERAN network that employs an extended EARFCN value range, and to inform multi-RAT-capable UE of neighboring E-UTRAN cells. The device includes a transceiver capable of wirelessly exchanging information with at least multi-RAT-capable UEs in the GERAN network; memory; and a controller operatively connected to the transceiver and the memory. The controller is capable of generating a SI23 message including E-UTRAN neighbor cell lists, using the extended EARFCN value range; and broadcasting the SI23 message in the GERAN network.

BRIEF DESCRIPTION OF THE DRAWINGS

The present invention will now be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

FIG. 4 is a listing of relevant portions of CSN.1 pseudocode for SI23 Rest Octets.

FIGS. 5A and 5B are listings of relevant portions of CSN.1 pseudocode for a Packet Measurement Order.

FIG. 6 is a listing of relevant portions of CSN.1 pseudocode for a Packet Cell Change Notification message.

FIG. 7 is a listing of relevant portions of CSN.1 pseudocode for a Packet Cell Change Order message.

FIG. 8 is a listing of relevant portions of CSN.1 pseudocode for a Packet Cell Change Failure message.

FIG. 9 is a listing of relevant portions of CSN.1 pseudocode for a Measurement Information message.

FIG. 10 is a listing of relevant portions of CSN.1 pseudocode for a Channel Release message.

DETAILED DESCRIPTION

Figure 1:
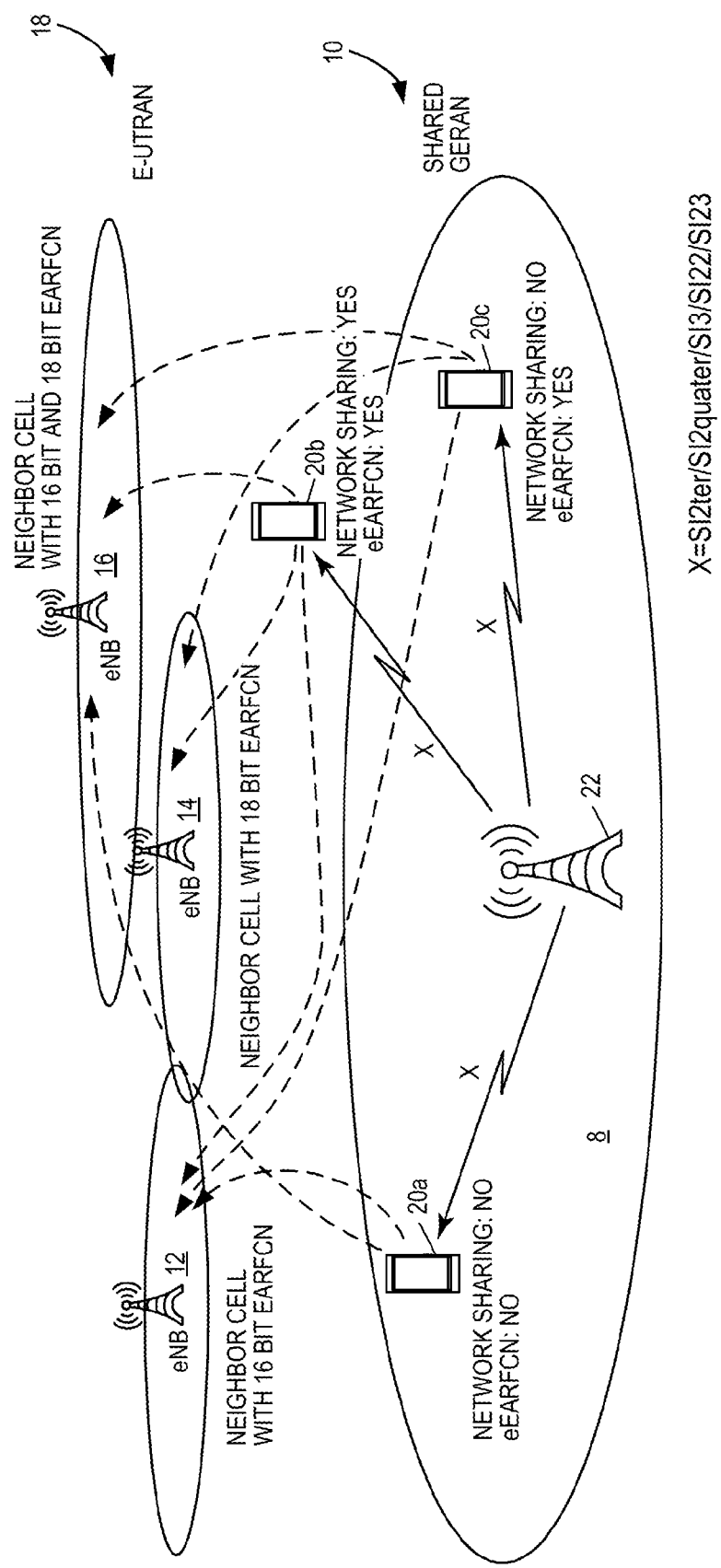
FIG. 1 is a network diagram of a GERAN network that supports network sharing and extended EARFCN, with E-UTRAN neighbor cells.

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Increasing the EARFCN value range in GERAN can be achieved, generally, by extending the legacy 16-bit EARFCN by 2 bits (i.e., providing a quadrupling of the legacy EARFCN space) in a way that allows a multi-RAT-capable UE that supports an extended EARFCN value range in GERAN (i.e., 18-bit EARFCNs) to acquire E-UTRAN neighbor cell information from the System Information type 23 message (SI23).

System Information (SI) messages are broadcast on broadcast channels (e.g., Broadcast Control Channel, or BCCH) in GERAN to convey various types of information. SI types are defined in 3GPP TS 44.018 Ver. 11.7.0. Some SI types relevant to the discussion herein are briefly summarized below:

A System Information type 3 (SI3) message is transmitted on the BCCH by the network and provides information of control on the Random Access Channel (RACH), the location area identification, the cell identity, and various other information about the cell. One indication in the SI3 message is the presence of an SI22 message.

A System Information type 13 (SI13) message is transmitted on the BCCH if indicated in a SI3 (or SI4, SI7, or SI8) message. The SI13 message is transmitted by the network to provide information related to GPRS in the cell. The SI13 Rest Octets include an Information Element (IE) having a field denoted SI_CHANGE_FIELD. Values 0-9 of this field are defined; all other values of this field are reserved for future use.

A System Information type 22 (SI22) message is transmitted on the BCCH if indicated in the SI3 message. The SI22 message is transmitted by the network to provide information about network sharing and domain-specific access control. One indication in the SI22 message is the presence of the SI23 message.

A System Information type 23 (SI23) message is transmitted on the BCCH if indicated in the SI22 message. The SI23 message is conventionally transmitted by the network when network sharing is employed in a cell, and provides PLMN-specific information about UTRAN/E-UTRAN frequencies related to inter RAT re-selection.

A System Information type 2quater (SI2quater) message is optionally transmitted on the BCCH by the network to all UEs within the cell to provide information on additional measurement and reporting parameters, UTRAN neighbor cells, and/or E-UTRAN neighbor frequencies. UEs without UTRAN/E-UTRAN capability should ignore (e.g., not use, or exclude from processing) the UTRAN/E-UTRAN specific parameters.

A System Information type 2ter (SI2ter) message is optionally transmitted on the BCCH by the network to all UEs within the cell to provide information on the extension of the BCCH allocation in the neighbor cells.

Increasing the EARFCN value range in GERAN may, according to various embodiments, include one or more of the following:

Although the SI23 message is conventionally only used to convey network sharing information, if the network does not support network sharing but does support extended EARFCNs (i.e., the extended range of EARFCNs), then the SI23 message may be transmitted. In this case, the SI23 message contents may be limited to E-UTRAN neighbor cell information, which is transmitted using 18-bit EARFCNs.

If the network supports both network sharing and inter-RAT mobility to E-UTRAN and UTRAN, then the SI23 message may provide both E-UTRAN neighbor cell information, which is transmitted using 18 bit EARFCNs, and UTRAN neighbor cell information.

If a multi-RAT-capable UE supports an extended EARFCN value range in GERAN and network sharing, then the multi-RAT-capable UE may acquire both UTRAN and E-UTRAN neighbor cell information from the SI23 message.

If a multi-RAT-capable UE supports an extended EARFCN value range in GERAN but does not support network sharing, then the multi-RAT-capable UE may acquire E-UTRAN neighbor cell information from the SI23 message and UTRAN neighbor cell information from a SI2quater or SI2ter message.

In one embodiment, an "Extended EARFCN support" bit within the Mobile Station Classmark 3 Information Element (IE) and/or Mobile Station Radio Access Capabilities IE is introduced. The Extended EARFCN support bit indicates that a UE supports an extended EARFCN value range in GERAN, as discussed, for example, in 3GPP TS 24.008 Ver. 11.11.0.

A network that is aware that a multi-RAT-capable UE supports an extended EARFCN value range in GERAN (e.g., because the Extended EARFCN support bit in the Mobile Station Classmark 3 IE and/or the Mobile Station Radio Access Capabilities IE is set to 1) can transmit to that UE point-to-point messages that include extended EARFCNs, on the Slow Associated Control Channel (SACCH), Fast Associated Control Channel (FACCH), and Packet Associated Control Channel (PACCH).

FIG. 1 depicts a cell 8 of a GERAN network 10 implementing support for network sharing and an extended EARFCN value range, and neighboring cells 12, 14, 16 of an E-UTRAN network 18. E-UTRAN cell 12 operates with E-UTRA frequency bands corresponding to legacy EARFCN values (i.e., 16-bit). E-UTRAN cell 14 operates with E-UTRA frequency bands corresponding to extended EARFCN values (i.e., 18-bit). E-UTRAN cell 16 operates with E-UTRA frequency bands corresponding to both 16-bit and 18-bit EARFCN values. Three multi-RAT-capable UEs 20 in the GERAN network 10 have differing capabilities. UE 20a supports neither network sharing nor an extended EARFCN value range. UE 20b supports both network sharing and an extended EARFCN value range. Finally, UE 20c supports an extended EARFCN value range but does not support network sharing.

The possible mobility paths of these UEs 20 into neighboring E-UTRAN cells 12, 14, 16 are depicted by dashed lines. The UE 20a, having only legacy EARFCN support, can move to E-UTRAN cells 12 or 16, both of which support the legacy EARFCN value range, but cannot move to cell 14 which only broadcasts frequency bands corresponding to 18-bit EARFCN values. UEs 20b and 20c may both move to any of the cells 12, 14, 16, as both UEs 20b, 20c support extended EARFCN; however, the mechanism by which UEs 20b and 20c determine the configurations of the neighbor cells may vary, as discussed herein, depending on UEs' 20b and 20c differing support of network sharing. The GERAN base station subsystem (BSS) 22 informs the UEs 20 of the capabilities of the neighboring cells 12, 14, 16 in different ways, collectively denoted X in FIG. 1, where X is one or more of SI2ter, SI2quater, SI13, SI22, and SI23 messages.

Figure 2:
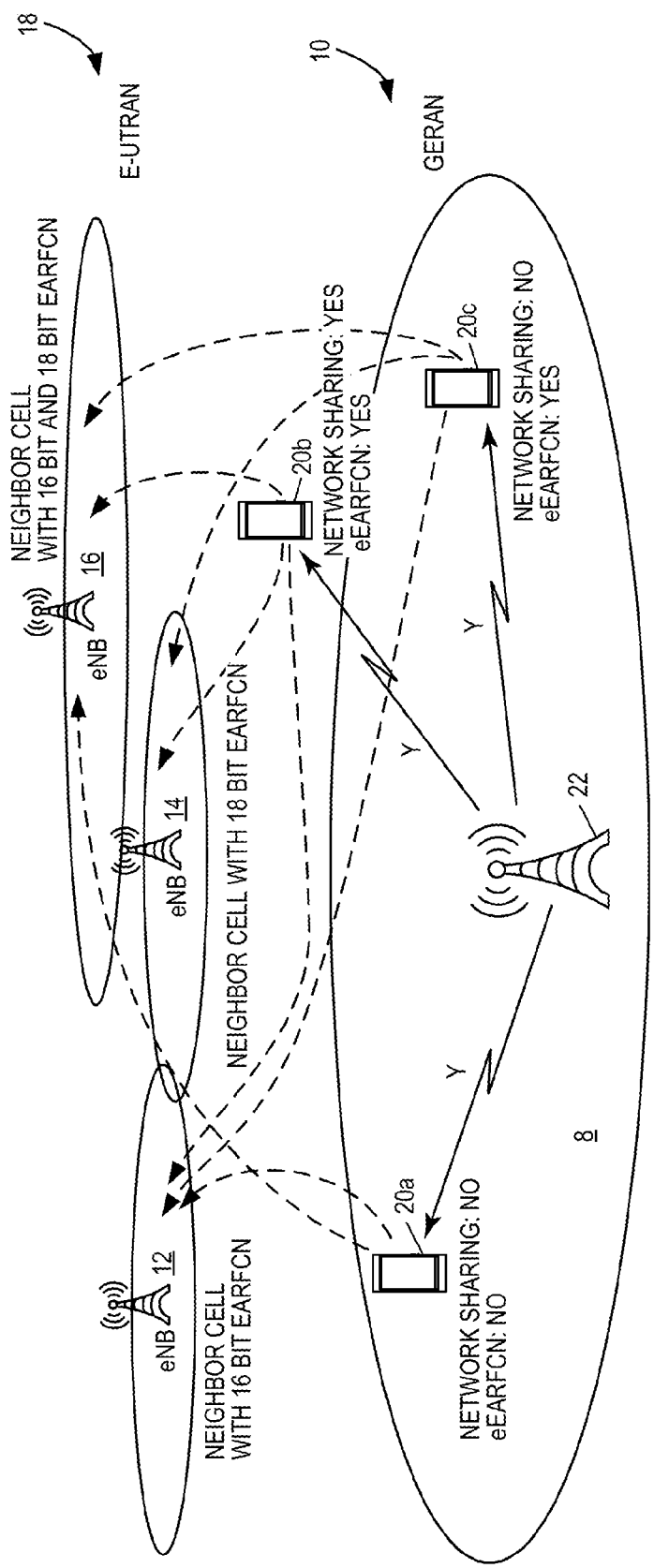
FIG. 2 is a network diagram of a GERAN network that supports extended EARFCN but not network sharing, with E-UTRAN neighbor cells.

FIG. 2 is a similar diagram, depicting a cell 8 in a GERAN network 10 that supports extended EARFCN value ranges but does not support network sharing. In this case, the UEs 20 have the same mobility options, as described with respect to FIG. 1. However, the information denoted Y in FIG. 2 broadcast by the GERAN BSS 22 is different. In this case, it is one or more of SI2ter, SI2quater, SI13, a limited option of SI22, and SI23 messages.

Figure 3:
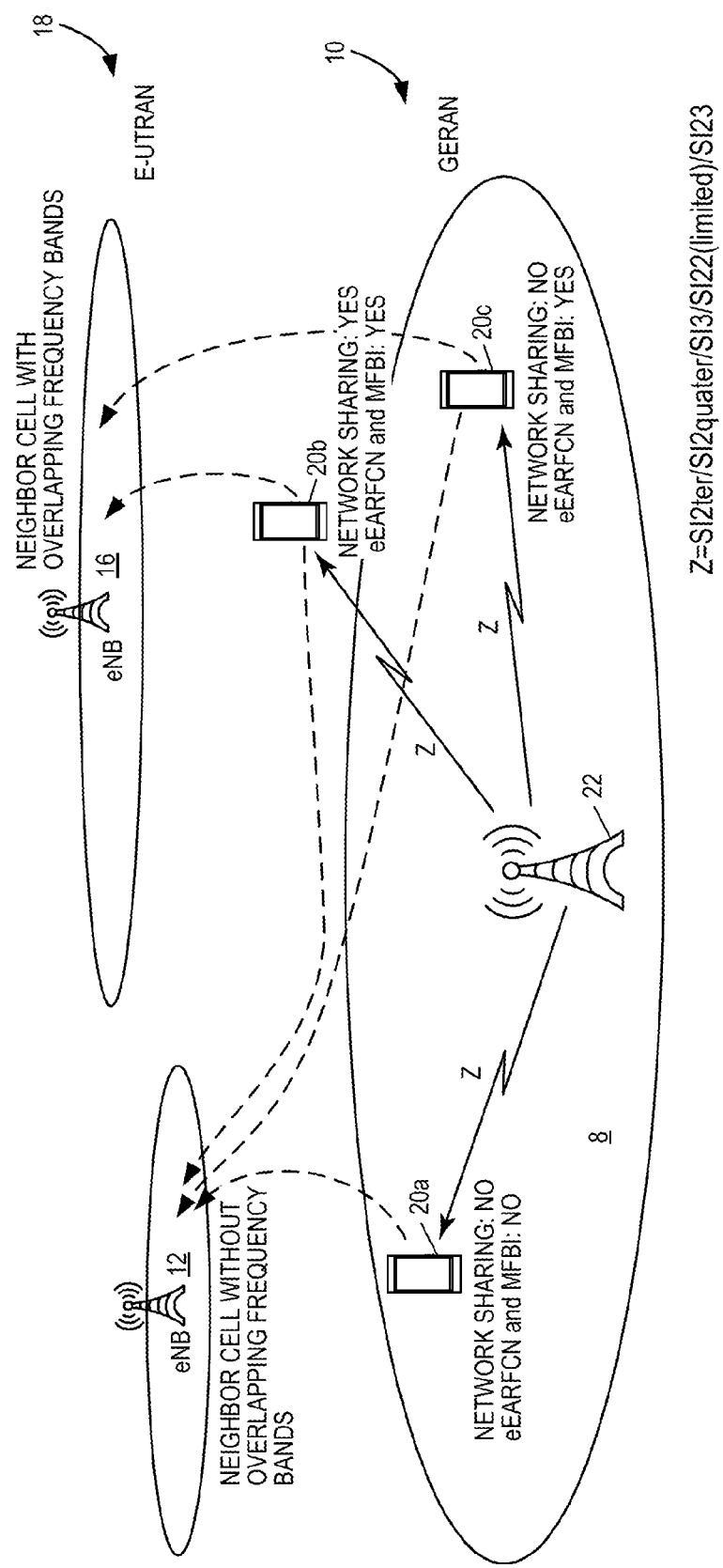
FIG. 3 is a network diagram of a GERAN network that supports extended EARFCN, and E-UTRAN neighbor cells with and without overlapping frequency bands.

FIG. 3 depicts a cell 8 in a GERAN network 10 that supports extended EARFCN value ranges, and neighboring cells 12, 16 of an E-UTRAN network 18. E-UTRAN cell 12 does not transmit on overlapping frequency bands, but E-UTRAN cell 16 does. The GERAN BSS 22 may transmit, to UEs 20a-20c, a Multi-Frequency Band Indicator (MFBI), such as in a SI23 message. This may save bandwidth by transmitting, in the SI23 message, only the set of EARFCNs that map to different physical frequencies. The relevant transmissions from the BSS 22 are denoted as Z, which may comprise one or more of SI2ter, SI2quater, SI13, a limited option of SI22, and SI23 messages.

FIG. 3 depicts the mobility options of UEs 20a, 20b, and 20c. UE 20a does not support the use of MFBI and as such will not understand the MFBI provided within a SI23 message. Accordingly, UE 20a may reliably migrate to E-UTRAN cell 12, which does not have overlapping frequency bands. UE 20a can also migrate to E-UTRAN cell 16, but will do so unreliably as it will not be guaranteed to find service there since it is unaware of the frequency bands in which the extended EARFCNs indicated by the SI23 message for cell 16 are supported. Since UE 20a does not understand the MFBI provided within the SI23 message, it will not know that it can reliably migrate to E-UTRAN cell 12 and unreliably migrate to E-UTRAN cell 16. UEs 20b and 20c both support MFBI and may receive MFBI within a SI23 message along with a neighbor cell list using extended EARFCN, and may both migrate to either E-UTRAN cell 12, which does not have overlapping frequency bands, or E-UTRAN cell 16, which does have overlapping frequency bands. According to embodiments of the present invention, the extended EARFCN value range may be supplemented by MFBI information in a SI23 message. As discussed in greater detail below, a SI2quater or SI22 message may carry indications to the UEs 20 that a SI23 message is broadcast in the GERAN network 10.

In one embodiment, a UE 20 determines information about support for extended EARFCN values in a network 10 by determining whether the SI23 message is broadcast in the cell 8. If so, the UE 20 determines that the network 10 transmits E-UTRAN 18 neighbor cell information using an extended EARFCN value range. In cases where the GERAN BSS 22 does not support network sharing but does support an extended EARFCN value range, a multi-RAT-capable UE 20 may determine the presence of the SI23 message (e.g., determine that the SI23 message was broadcast) in a variety of ways, as detailed herein.

For example, the SI22 message may indicate the presence of the SI23 message, as per legacy procedures, e.g., based on an SI23 indicator, but the SI22 message may not provide any network sharing information. In this embodiment, a multi-RAT-capable UE 20 that supports an extended EARFCN value range in GERAN 10 could process the SI22 and SI23 messages even if the multi-RAT-capable UE 20 does not support network sharing.

If a multi-RAT-capable UE 20 supports an extended EARFCN value range in GERAN 10 and network sharing, and the multi-RAT-capable UE 20 determines that the SI22 message is present using legacy procedures, then by reading the SI22 message, the multi-RAT-capable UE 20 will determine that the SI23 message is present. Further, by reading the SI22 message, the UE 20 may (a) determine that no network sharing information is present therein, thereby determining that network sharing is not supported by the network 10; and (b) determine that the SI23 message is present, thereby determining that the network 10 transmits E-UTRAN 18 neighbor cell information therein (i.e., using 18 bit EARFCNs).

If a multi-RAT-capable UE 20 supports an extended EARFCN value range in GERAN 10 but does not support network sharing, and the multi-RAT-capable UE 20 determines that the SI22 message is present using legacy procedures, the multi-RAT-capable UE 20 can determine, by reading the SI22 message, that the SI23 message is present and thereby determines that the network 10 transmits E-UTRAN 18 neighbor cell information therein (i.e., using 18 bit EARFCNs). A multi-RAT-capable UE 20 that supports an extended EARFCN value range in GERAN 10 could process the SI22 and SI23 messages even when the multi-RAT-capable UE 20 does not support network sharing, but the multi-RAT-capable UE 20 will ignore everything in the SI22 message other than the SI23 indicator field.

In one embodiment, new information added to a SI2quater message indicates the presence of extended EARFCNs in the SI23 message. The new information could, for example, include (a) a flag indicating the SI23 message is present; or (b) a new (e.g., currently reserved) EARFCN value that would not be understood by a legacy UE 20 (i.e. a UE 20 incapable of supporting an extended EARFCN value range in GERAN 10). 3GPP TS 36.331 lists reserved EARFCN values. The reserved EARFCN value would, however, be understood by a multi-RAT-capable UE 20 that supports an extended EARFCN value range in GERAN 10 to mean that the SI23 message is broadcast in the GERAN network. As one example, the last EARFCN legacy value of 65535 may be used as such an indicator.

In this embodiment, if a multi-RAT-capable UE 20 supports an extended EARFCN value range in GERAN 10 and network sharing, then the multi-RAT-capable UE 20 determines that the SI23 message is present by reading a SI2quater message and thereby determines that the network 10 transmits E-UTRAN 18 neighbor cell information therein (i.e., using 18 bit EARFCNs).

Similarly, if a multi-RAT-capable UE 20 supports an extended EARFCN value range in GERAN 10 but does not support network sharing, then the multi-RAT-capable UE 20 determines that the SI23 message is present by reading a SI2quater message and thereby determines that the network 10 transmits E-UTRAN 18 neighbor cell information therein (i.e., using 18 bit EARFCNs) in the "Priority and E-UTRAN Parameters Description for the Common PLMN" IE. This means a multi-RAT-capable UE 20 that supports an extended EARFCN value range in GERAN 10 will need to understand (e.g., be capable of processing) the SI23 message even when the multi-RAT-capable UE 20 does not support network sharing.

Some embodiments include detecting changes to the SI23 message. If the network 10 does not support network sharing, but does support extended EARFCNs, then a change to the content of the SI23 message information may be signaled either as (a) per legacy operation in the SI13 Rest Octets IE in the SI13 message (i.e. based on the SI_CHANGE_FIELD value of 9, indicating an update of the SI22 or SI23 message); or by (b) a new SI_CHANGE_FIELD value in the SI13 Rest Octets IE. For example, a SI_CHANGE_FIELD value of 10 may be defined to indicate that the SI23 message has extended EARFCN information.

If the multi-RAT-capable UE 20 supports an extended EARFCN value range in GERAN 10 but does not support network sharing, then the multi-RAT-capable UE 20 may determine that the legacy SI_CHANGE_FIELD value of 9 (i.e., indicating an update of the SI22 or SI23 message) in the SI13 Rest Octets IE means that only E-UTRA 18 related changes to the SI23 message have occurred.

If the multi-RAT-capable UE 20 supports an extended EARFCN value range in GERAN 10 and network sharing, then the multi-RAT-capable UE 20 will re-read the SI22 message and determine that no change to the network sharing information is provided. It may then determine that the legacy SI_CHANGE_FIELD value of 9 (i.e., indicating an update of the SI22 or SI23 message) in the SI13 Rest Octets IE means that only E-UTRA 18 related changes to the SI23 message have occurred.

If the network 10 does not support network sharing, but does support extended EARFCNs, and a new SI_CHANGE_FIELD value is introduced in the SI13 Rest Octets IE, then a change to the content of the SI23 message information may be signaled using the new SI_CHANGE_FIELD value (e.g., set to 10).

If the multi-RAT-capable UE 20 supports an extended EARFCN value range in GERAN 10, then the multi-RAT-capable UE 20 determines that the new SI_CHANGE_FIELD value means that only E-UTRA 18 related changes to the SI23 message have occurred (i.e., regardless of whether or not the UE 20 supports network sharing).

FIGS. 4-10 depict examples of how the existing 16 bit EARFCN field specifications may be changed to 18 bit fields, for various IEs and messages. These figures depict the relevant parts of data structure specifications using the Concrete Syntax Notation One (CSN.1), well known to those of skill in the wireless communication arts. The fields requiring changes are underlined in the figures.

FIG. 4 depicts the SI23 Rest Octets. Element 30, the "Priority and UTRAN Parameters Description struct", needs to be updated. This struct, a listing of which begins at 32, calls the "Repeated E-UTRAN Neighbour Frequency and Priority struct" at 34. Within this struct, a listing of which begins at 36, EARFCN is defined as an 18-bit value at 38, which was changed from its legacy value of 16 bits. In an actual application, it may be advantageous to maintain the legacy code, with the definition of EARFCN as a 16-bit value. Accordingly, in one embodiment, a new struct, denoted for example, "Repeated E-UTRAN Neighbour Frequency and Priority 2 struct" at 36, which includes the 18-bit EARFCN definition at 38, may be defined and called by the parent "Priority and UTRAN Parameters Description struct" at 30.

As described above, in some cases, the GERAN network 10 is aware of the ability of a UE 20 to interpret (e.g., process) extended EARFCN values, such as by reading an "Extended EARFCN support" bit having a value of 1 from the Mobile Station Classmark 3 IE or Mobile Station Radio Access Capabilities IE (as defined in 3GPP TS 24.008). In this case, the network 10 may transmit point-to-point messages to the UE 20, which include 18-bit EARFCN values, e.g., on the SACCH, FACCH, and PACCH.

FIGS. 5A and 5B depict an example of how this can be accomplished in the case of a Packet Measurement Order transmitted on the PACCH. The Order calls "Priority and E-UTRAN Parameters Description 2" struct at 40, and also calls "Individual Priorities 2" IE at 42.

The "Priority and E-UTRAN Parameters Description 2 struct" listing begins at 44; it calls "E-UTRAN Parameters 2 IE" at 46.

The "E-UTRAN Parameters 2 IE" listing begins at 48, and calls the "Repeated E-UTRAN Neighbour Cells 2 struct" at 50.

The "Repeated E-UTRAN Neighbour Cells 2 struct" listing begins at 52, and defines EARFCN as an 18-bit field at 54.

The listing for "Individual Priorities 2 IE", also called in the Packet Cell Change Order message of FIG. 7 as "Individual Priorities IE" at 87, begins at 56, and calls "E-UTRAN Individual Priority Parameters Description 2 struct" at 58.

The "E-UTRAN Individual Priority Parameters Description 2 struct" listing begins at 60, and calls "Repeated Individual E-UTRAN Priority Parameters 2 struct" at 62.

The "Repeated Individual E-UTRAN Priority Parameters 2 struct" listing begins at 64, and defines EARFCN as an 18-bit field at 66.

FIG. 6 depicts similar changes to the Packet Cell Change Notification message. The message calls "E-UTRAN Target Cell" struct at 70. The listing for "E-UTRAN Target Cell struct" begins at 72, and defines EARFCN as an 18-bit field at 74.

FIG. 7 depicts similar changes to the Packet Cell Change Order message. The message calls "E-UTRAN Target Cell"

IE at 80, and "Individual Priorities" IE at 82. The listing for "E-UTRAN Target Cell IE" begins at 84, and defines EARFCN as an 18-bit field at 86. The listing for "Individual Priorities IE" begins at 87, and calls "E-UTRAN Individual Priority Parameters Description" struct at 88. This struct, and those it calls, are depicted in FIG. 5B as "E-UTRAN Individual Priority Parameters Description 2" struct at 58, illustrating that EARFCN is defined as an 18-bit value.

FIG. 8 depicts similar changes to the Packet Cell Change Failure message. The message calls "E-UTRAN Target Cell" IE at 90. The listing for "E-UTRAN Target Cell IE" begins at 92, and defines EARFCN as an 18-bit field at 94.

FIG. 9 depicts similar changes to the Measurement Information message. The message calls "E-UTRAN Parameters Description" struct at 100. The listing for "E-UTRAN Parameters Description struct" begins at 102, and calls "Repeated E-UTRAN Neighbour Cells" struct at 104. The listing for "Repeated E-UTRAN Neighbour Cells struct" begins at 106, and defines EARFCN as an 18-bit field at 108.

FIG. 10 depicts similar changes to the Channel Release message. The listing for the "Cell Selection Indicator after release of all TCH and SDCCH value part" IE begins at 110, and calls "E-UTRAN Description" struct at 112. The listing for "E-UTRAN Description struct" begins at 114, and defines EARFCN as an 18-bit field at 116.

Figure 11:
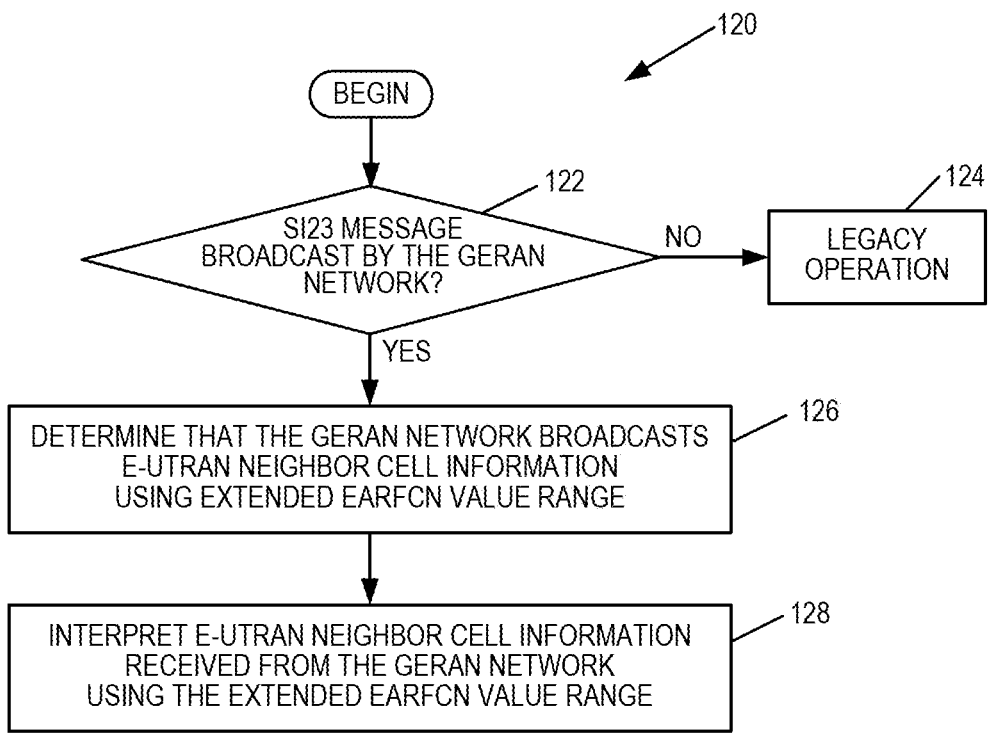
FIG. 11 is a flow diagram of a method performed by a UE.

FIG. 11 is a flow diagram of a method 120, performed by a multi-RAT-capable UE 20 that supports an extended EARFCN value range in GERAN. The UE 20 is capable of operating in a GERAN network 10. The UE 20 determines whether a SI23 message is broadcast by the GERAN network 10 (block 122). This determination may be accomplished in various ways. For example, in one embodiment, the UE 20 may determine whether a SI22 message is broadcast by the GERAN network, read the SI22 message, and, from an indicator in the SI22 message, determine whether the SI23 message is broadcast by the GERAN network. In another embodiment, the UE 20 may read a SI2quater message broadcast by the GERAN network, and determine from an indicator in the SI2quater message that the SI23 message is broadcast by the GERAN network. The indicator may, for example, comprise a flag or a unique EARFCN value. Additionally, the UE 20 may detect that the SI23 message has changed, and in response to this, the UE 20 will reread the SI23 message. The UE 20 may detect that the SI23 message has changed by reading a field in the SI13 Rest Octets IE, wherein the field may be set to a unique value that indicates that the SI23 message contains updated EARFCN information. Regardless of which means the UE 20 uses to determine whether the SI23 message is broadcast in the GERAN network, if it finds that SI23 is not broadcast in the GERAN network ("NO" decision of block 122), the UE 20 proceeds according to legacy operation—for example, obtaining E-UTRAN neighbor cell lists, if at all, using the legacy (16-bit) EARFCN.

However, if the multi-RAT-capable UE 20 determines that the SI23 message is broadcast in the GERAN network 10 ("YES" decision of block 122), it determines from this that the GERAN network 10 broadcasts E-UTRAN neighbor cell information using the extended EARFCN value range (i.e., 18 bits) (block 126). Accordingly, the multi-RAT-capable UE 20 determines E-UTRAN neighbor cell information (such as that obtained, for example, from the SI23 message) using the extended EARFCN value range (i.e., 18 bits) (block 128).

Figure 12:
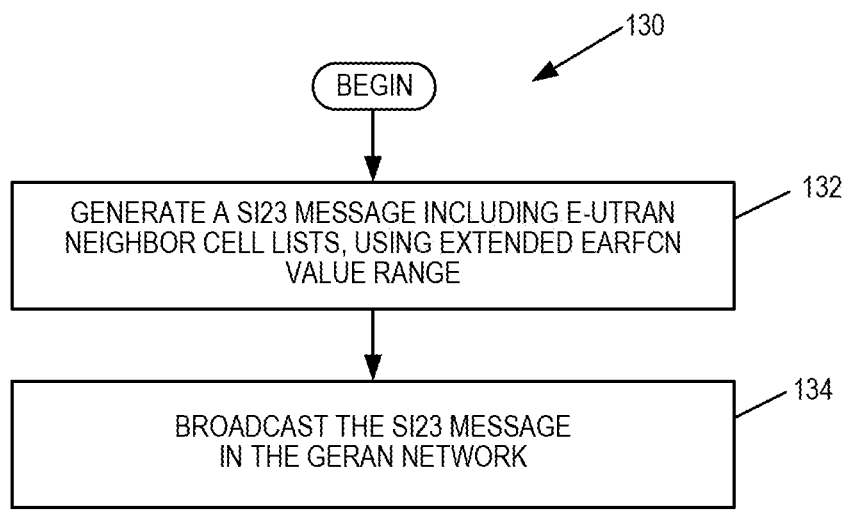
FIG. 12 is a flow diagram of a method performed by a BSS.

FIG. 12 is a flow diagram of a method 130, performed by a base station subsystem (BSS) 22 in a GERAN network 10 that employs the extended EARFCN value range, of informing multi-RAT-capable UEs 20 of neighboring E-UTRAN cells. According to the method 130, the GERAN BSS 22 generates a SI23 message including E-UTRAN neighbor cell lists, using the extended EARFCN value range (block 132). The GERAN BSS 22 then broadcasts the SI23 message in the GERAN network 10.

In various embodiments, the GERAN BSS 22 may additionally generate a SI22 message including an indicator that the SI23 message is broadcast, and broadcast the SI22 message in the GERAN network. Alternatively, the GERAN BSS 22 may generate a SI2quater message including an indicator that the SI23 message is broadcast, and broadcast the SI2quater message in the GERAN network 10. Such an indicator may comprise a flag, or a unique EARFCN value. If the GERAN BSS 22 updates the extended EARFCN information broadcast in the SI23 message, it may set a SI_CHANGE_FIELD field of a SI13 Rest Octets IE to a value indicating a change to the SI23 message, and then broadcast the SI13 message including the set SI_CHANGE_FIELD in the GERAN network 10.

Figure 13:
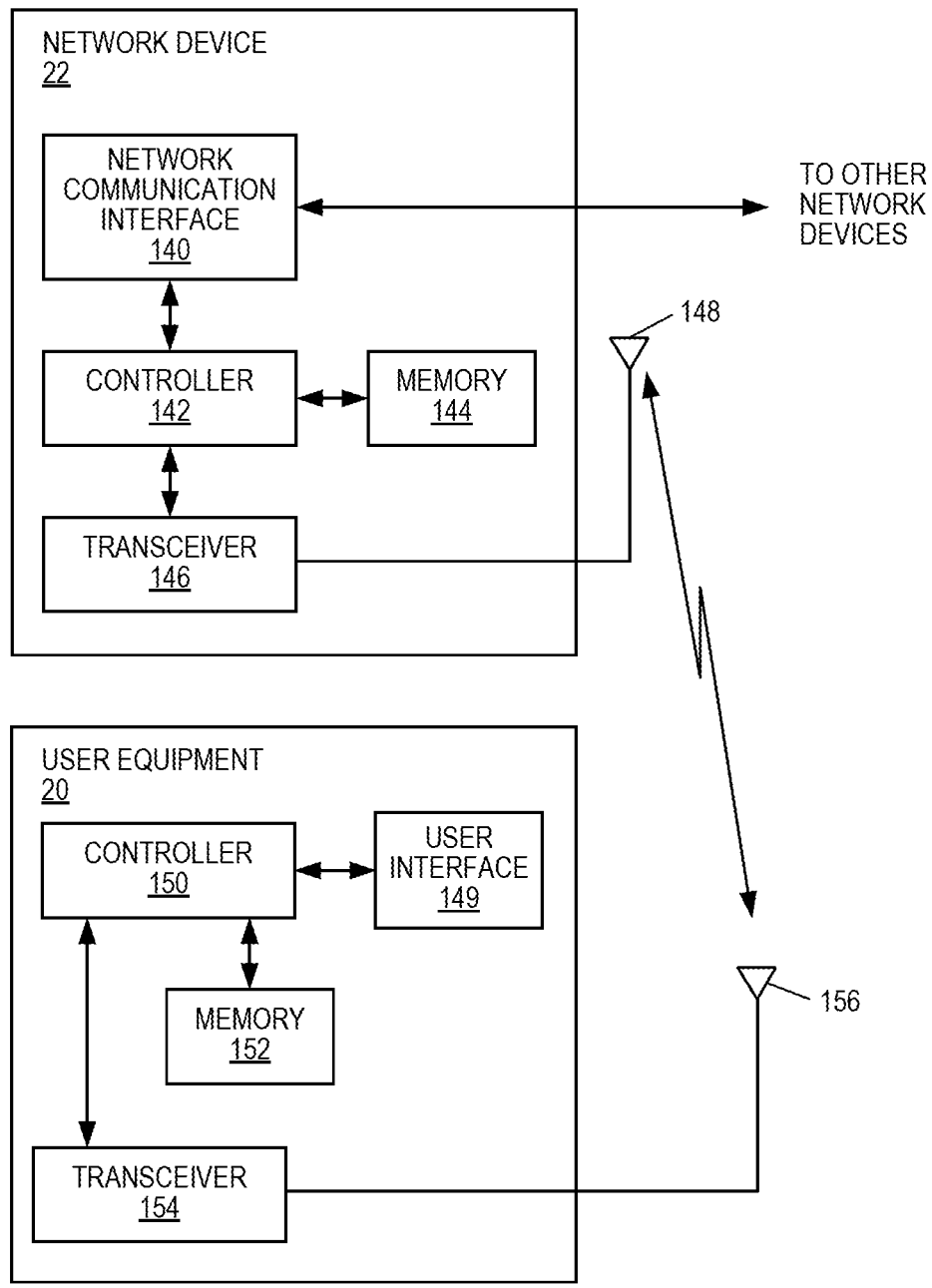
FIG. 13 is a functional block diagram of a network device operative as a BSS, and of a UE.

FIG. 13 depicts a network device 22 operative as a base station subsystem (BSS) in a GERAN network 10 that employs an extended EARFCN value range. As those of skill in the art are aware, a BSS 22 is a network device capable of providing wireless communication services to one or more UEs 20 in a geographic region, known as a cell or sector. The device 22 includes a network communication interface 140 capable of exchanging data with other network devices; a controller 142; memory 144; and a transceiver 146 connected to one or more antennas 148, capable of effecting wireless communication across an air interface to one or more UEs 20. According to embodiments of the present invention, the memory 144 is capable of storing, and the controller 142 is capable of executing, software which when executed is capable of causing the network device 22 to perform methods and functions described herein.

FIG. 13 also depicts a multi-RAT-capable UE 20 capable of interpreting (e.g., processing) extended EARFCN, and capable of operating in a GERAN network 10. As those of skill in the art are aware, a UE 20 is a device, which may be battery-powered and hence mobile, capable of operating within a wireless communication network 10. The UE 20 includes a user interface 149 (e.g., display, touchscreen, keyboard or keypad, microphone, speaker, and the like); a controller 150; memory 152; and one or more transceivers 154 connected to one or more antennas 156, capable of effecting wireless communication across an air interface to at least one BSS 22. The UE 20 may additionally include one or more features such as a camera, removable memory interface, short-range communication interface (e.g., Wi-Fi, Bluetooth, and the like), wired interface (USB), and the like (i.e., not shown in FIG. 13). According to embodiments of the present invention, the memory 152 is capable of storing, and the controller 150 is capable of executing, software which when executed is capable of causing the UE 20 to perform methods and functions described herein.

In all embodiments, the controller 142, 150 may comprise any sequential state machine capable of executing machine instructions stored as machine-readable computer programs in the memory, such as one or more hardware-implemented state machines (e.g., in discrete logic, FPGA, ASIC, etc.); programmable logic together with appropriate firmware; one or more stored-program, general-purpose processors, such as a microprocessor or Digital Signal Processor (DSP), together with appropriate software; or any combination of the above.

In all embodiments, the memory 144, 152 may comprise any non-transitory machine-readable media known in the art or that may be developed, including but not limited to magnetic media (e.g., floppy disc, hard disc drive, etc.), optical media (e.g., CD-ROM, DVD-ROM, etc.), solid state media (e.g., SRAM, DRAM, DDRAM, ROM, PROM, EPROM, Flash memory, solid state disc, etc.), or the like.

In all embodiments, the transceivers 146, 154 may comprise analog and/or digital radio circuitry capable of communicating with one or more other transceivers 154, 146 via a Radio Access Network according to one or more Radio Access Technologies (RAT) and communication protocols known in the art or that may be developed, such as IEEE 802.xx, CDMA, WCDMA, GSM, EDGE, LTE, UTRAN, E-UTRAN, WiMax, or the like. In particular, the transceiver 146 in the network device 22 (under control of the controller 142) is capable of effecting communications in a GERAN network 10. The transceiver 154 in the multi-RAT-capable UE 20 (under control of the controller 150) is capable of effecting communications in a GERAN network 10, and additionally in at least one other Radio Access Technology, such as E-UTRAN 18. The transceiver 146, 154 implements transmitter and receiver functionality appropriate to the Radio Access Network links (e.g., frequency allocations, (de)modulation, up/down frequency conversion, amplification, interference suppression, and the like). The transmitter and receiver functions may share circuit components and/or software, or alternatively may be implemented separately.

In all embodiments, the network communication interface 140 may comprise a receiver and transmitter interface capable of communicating with one or more other network devices over a communication network according to one or more communication protocols known in the art or that may be developed, such as IMS/SIP, Diameter, HTTP, RTP, RTCP, HTTPs, SRTP, CAP, DCCP, Ethernet, TCP/IP, SONET, ATM, or the like. The network communication interface 140 implements receiver and transmitter functionality appropriate to the communication network links (e.g., optical, electrical, and the like). The transmitter and receiver functions may share circuit components and/or software, or alternatively may be implemented separately.

Embodiments of the present invention provide significant advantages over the prior art. By providing E-UTRAN neighbor cell lists using extended EARFCNs in GERAN networks 10, the interoperability of multi-RAT-capable UEs that support an extended EARFCN value range is enhanced in a future-proof manner, quadrupling the EARFCN value range. Embodiments described herein account for the possibility of network sharing capability by the GERAN network 10 and the multi-RAT-capable UEs 20, provide for diverse means for a multi-RAT-capable UE 20 to determine presence of a SI23 message, and provide for updating of the SI23 message and notification thereof.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method, performed by a multi-Radio Access Technologies (RAT)-capable User Equipment (UE) that supports an extended Evolved Universal Terrestrial Radio Access (E-UTRA) Absolute Radio Frequency Channel Number (EARFCN) value range in GSM EDGE Radio Access Network (GERAN), the UE capable of operating in a GERAN network, the method comprising:

transmitting to the GERAN network an indication that the UE is capable of supporting the extended EARFCN value range, wherein the indication comprises a support bit in one of a Mobile Station Classmark 3 Information Element (IE) and a Mobile Station Radio Access Capabilities IE;

determining that a System Information type 23 (SI23) message is broadcast by the GERAN network, wherein the SI23 message comprises E-UTRAN neighbor cell information using the extended EARFCN value range; and processing the E-UTRAN neighbor cell information using the extended EARFCN value range.

2. The method of claim 1 further comprising:

determining that a System Information type 22 (SI22) message is broadcast by the GERAN network; and, determining that the GERAN network supports network sharing in response to determining that the SI22 message is broadcast.

3. The method of claim 1 further comprising:

detecting that the SI23 message has changed; and rereading the SI23 message in response to detecting that the SI23 message has changed.

4. The method of claim 3 wherein the detecting that the SI23 message has changed comprises detecting a value in a SI_CHANGE_FIELD field of a System Information type 13 (SI13) Rest Octets Information Element (IE), which indicates that the SI23 message contains updated EARFCN information.

5. The method of claim 1, wherein the extended EARFCN value range is 0 through 262143.

6. A multi-Radio Access Technologies (RAT)-capable User Equipment (UE) capable of operating in a GSM EDGE Radio Access Network (GERAN) network and that supports an extended Evolved Universal Terrestrial Radio Access (E-UTRA) Absolute Radio Frequency Channel Number (EARFCN) value range, comprising:

a transceiver capable of wirelessly exchanging information with a base station subsystem of the GERAN network;

a memory;

a controller operatively connected to the transceiver and the memory, and capable of transmitting to the GERAN network an indication that the UE is capable of supporting the extended EARFCN value range, wherein the indication comprises a support bit in one of a Mobile Station Classmark 3 Information Element (IE) and a Mobile Station Radio Access Capabilities IE;

determining that a System Information type 23 (SI23) message is broadcast by the GERAN network, wherein the SI23 message comprises E-UTRAN neighbor cell information using the extended EARFCN value range; and processing the E-UTRAN neighbor cell information using the extended EARFCN value range.

7. The UE of claim 6 wherein the controller is further capable of determining that a System Information type 22 (SI22) message is broadcast by the GERAN network, and, determining that the GERAN network supports network sharing in response to determining that the SI22 message is broadcast.

8. The UE of claim 6 wherein the controller is further capable of:
    detecting that the SI23 message has changed; and
    rereading the SI23 message in response to detecting that the SI23 message has changed.

9. The UE of claim 8 wherein the controller is capable of detecting that the SI23 message has changed by detecting a value in the SI_CHANGE_FIELD of a System Information type 13 (SI13) Rest Octets Information Element (IE), which indicates that the SI23 message contains updated EARFCN information.

10. The UE of claim 6, wherein the extended EARFCN value range is 0 through 262143.

11. A method, performed by a base station subsystem (BSS) in a GSM EDGE Radio Access Network (GERAN) that employs an extended Evolved Universal Terrestrial Radio Access (E-UTRA) Absolute Radio Frequency Channel Number (EARFCN) value range, of informing multi-Radio Access Technologies (RAT)-capable User Equipment (UE) of neighboring Evolved Universal Mobile Telecommunications System Radio Access Network (E-UTRAN) cells, the method comprising:
    broadcasting a System Information type 23 (SI23) message in the GERAN network, wherein the SI23 message comprises E-UTRAN neighbor cell information using the extended EARFCN value range;
    updating extended EARFCN information broadcast in the SI23 message;
    setting a SI_CHANGE_FIELD field of a System Information type 13 (SI13) Rest Octets Information Element (IE) to a value indicating a change to the SI23 message; and
    broadcasting a SI13 message including the set SI_CHANGE_FIELD field in the GERAN network.

12. The method of claim 11, wherein the BSS supports network sharing, and further comprising:
    generating a System Information type 22 (SI22) message including an indicator that the SI23 message is broadcast; and
    broadcasting the SI22 message in the GERAN network.

13. The method of claim 11, further comprising:
    receiving an indication that the UE is capable of supporting the extended EARFCN value range, wherein the indication comprises a support bit in one of a Mobile Station Classmark 3 Information Element (IE), and a Mobile Station Radio Access Capabilities IE.

14. The method of claim 11, wherein the extended EARFCN value range is 0 through 262143.

15. A network device, capable of operating in a GSM EDGE Radio Access Network (GERAN) that employs an extended Evolved Universal Terrestrial Radio Access (E-UTRA) Absolute Radio Frequency Channel Number (EARFCN) value range, and to inform multi-Radio Access Technologies (RAT)-capable User Equipment (UE) of neighboring Evolved Universal Mobile Telecommunications System Radio Access Network (E-UTRAN) cells, comprising:
    a transceiver capable of wirelessly exchanging information with at least multi-RAT-capable UEs in the GERAN network;
    a memory;
    a controller operatively connected to the transceiver and the memory, and capable of broadcasting a System Information type 23 (SI23) message in the GERAN network, wherein the SI23 message comprises E-UTRAN neighbor cell information using the extended EARFCN value range;
    updating extended EARFCN information broadcast in the SI23 message;
    setting a SI_CHANGE_FIELD field of a System Information type 13 (SI13) Rest Octets Information Element (IE) to a value indicating a change to the SI23 message; and
    broadcasting a SI13 message including the set SI_CHANGE_FIELD field in the GERAN network.

16. The device of claim 15, wherein the GERAN network supports network sharing, and wherein the controller is further capable of:
    generating a System Information type 22 (SI22) message including an indicator that the SI23 message is broadcast; and
    broadcasting the SI22 message in the GERAN network.

17. The device of claim 15, wherein the controller is further capable of:
    receiving an indication that the UE is capable of supporting the extended EARFCN value range, wherein the indication comprises a bit in one of a Mobile Station Classmark 3 Information Element (IE), and a Mobile Station Radio Access Capabilities IE.

18. The network device of claim 15, wherein the extended EARFCN value range is 0 through 262143.

* * * * *

UNITED STATES PATENT AND TRADEMARK OFFICE
CERTIFICATE OF CORRECTION

PATENT NO. : 9,763,171 B2  
APPLICATION NO. : 15/187127  
DATED : September 12, 2017  
INVENTOR(S) : Persson et al.

Page 1 of 1

It is certified that error appears in the above-identified patent and that said Letters Patent is hereby corrected as shown below:

In the Drawings

In Fig. 1, Sheet 1 of 13, delete "X=SI2ter/SI2quater/SI3/SI22/SI23" and insert
-- X=SI2ter/SI2quater/SI13/SI22/SI23 --, therefor.

In Fig. 2, Sheet 2 of 13, delete "Y=SI2ter/SI2quater/SI3/SI22 (limited)/SI23" and insert
-- Y=SI2ter/SI2quater/SI13/SI22 (limited)/SI23 --, therefor.

In Fig. 3, Sheet 3 of 13, delete "Z=SI2ter/SI2quater/SI3/SI22(limited)/SI23" and insert
-- Z=SI2ter/SI2quater/SI13/SI22(limited)/SI23 --, therefor.

In the Claims

In Column 14, Line 30, in Claim 16, delete "The device" and insert -- The network device --, therefor.

In Column 14, Line 37, in Claim 17, delete "The device" and insert -- The network device --, therefor.

Signed and Sealed this
First Day of September, 2020

Andrei Iancu
*Director of the United States Patent and Trademark Office*